United States Patent Office 3,018,966
Patented Jan. 30, 1962

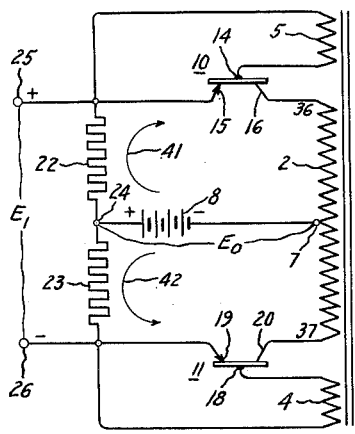
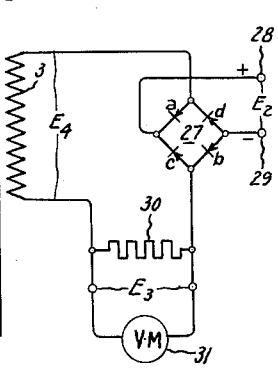
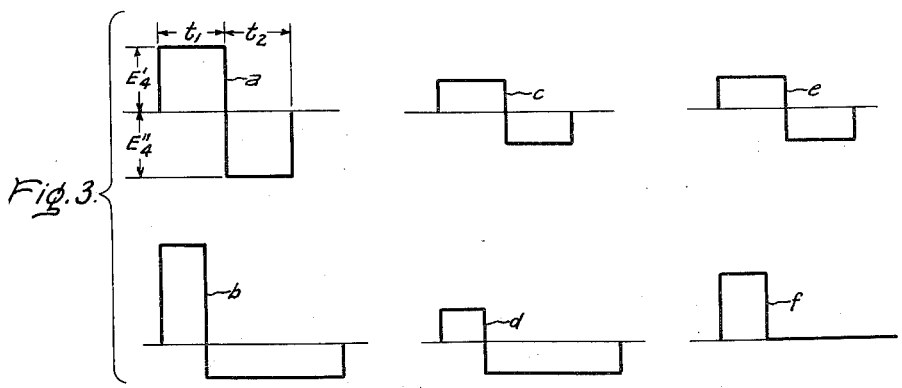
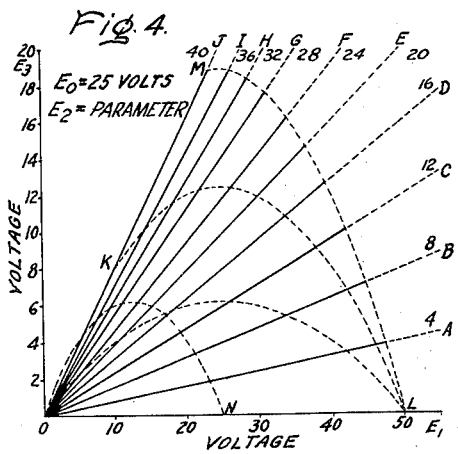
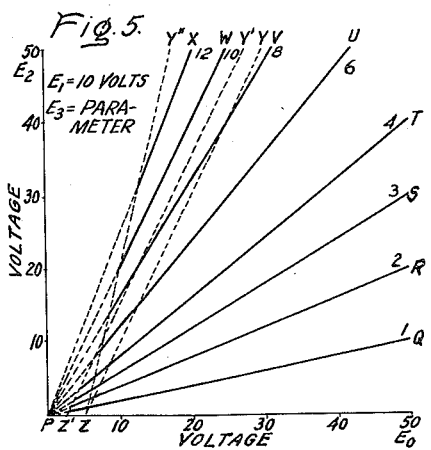
Inventor:
William B. Zelina,
by
His Attorney.

3,018,966
ELECTRIC FUNCTION NETWORK
William B. Zelina, Erie, Pa., assignor to General Electric Company, a corporation of New York
Filed May 3, 1955, Ser. No. 505,715
13 Claims. (Cl. 235—195)

My invention relates to a unidirectional voltage multiplying or dividing network and more particularly to networks delivering an output voltage representing the product or quotient of unidirectional voltages applied thereto.

For many years the industry has been searching for a network completely free from moving parts or rotating machines that will yield the product or quotient of unidirectional electrical quantities. In certain apparatus or equipment such as measurement and control systems, computers and other intelligence handling devices and systems, it is necessary or desirable to generate functions proportional to either the product or quotient of two or more input signals. In general this has been accomplished either by mechanical or electro-mechanical means, that is by apparatus involving the use of both electrical and mechanical elements, or by what is commonly termed "static" circuitry composed entirely of electrical elements, all of the function generating operations being performed in the latter case in the electrical domain without transducing to mechanical signals.

Moving coil meters, such as the ordinary wattmeter, represent a typical example of the electro-mechanical approach while the multiplying and dividing circuits commonly employed in analog computers are typical of the static type of apparatus. It will be appreciated that in many applications, the use of electro-mechanical devices may create certain problems. For instance, the output of an otherwise suitable system may be mechanical where an electrical output is desired, thus making an additional transducing stage necessary. Such a problem can be particularly vexing in electric control systems where amplification of the output signal may be required and electric amplification means are to be employed. Or, the application may be such that unacceptable inaccuracies or mechanical failure is produced by environmental conditions involving, for instance, changes in temperature or mechanical shock or vibration.

Completely static multiplying and dividing systems, on the other hand, have generally been comprised of relatively complex circuitry involving large numbers of circuit elements. Some, for example, require closely regulated alternating current or high voltage unidirectional power supplies for reasonably accurate operation and others simply do not afford desired accuracy of operation. Moreover, in some systems, the initial cost is prohibitive in relation to the value of the other components of the application or alternatively a relatively large amount of maintenance and adjustment is required to maintain useful accuracy.

Therefore, an object of this invention is to provide a simple, reliable, accurate and low cost network for multiplying or dividing unidirectional voltages.

A further object of this invention is to provide a simple and reliable network free of moving parts delivering an output indicative of the product of two applied electric signals.

In carrying out one form of my invention, when used as a multiplier, one input voltage is utilized to modify the transfer action of a self-excited rectangular wave oscillator having its feedback path completed through mutual coupling of windings disposed on a saturable magnetic core. The output signal of this rectangular wave oscillator is then applied to a rectifier network which is excited from a second input voltage, and the resultant current is proportional to the product of the input quantities.

In the above operation, the oscillator is connected with a constant unidirectional voltage. When operated as a divider, this voltage is replaced by a signal representing the divisor, a signal corresponding to the dividend is applied to one of the previous input terminals, and the other of the multiplier input terminals is excited from a constant source or reference voltage. When used as a regulator, one input voltage is proportional to load current and the other input voltage is proportional to line voltage with the resultant current controlling fuel rate of a prime mover or the excitation of the generator.

Further objects and advantages of this invention will become apparent and this invention will be better understood from the following description with reference to the accompanying drawing. The features of novelty which characterize this invention will be pointed out with particularity in the claims annexed to and forming part of this specification.

In the drawing:

FIGURE 1 is a schematic circuit showing one embodiment of my invention;

FIGURE 2 shows a simplified motor control circuit adapted to utilize the multiplier shown in FIGURE 1;

FIGURE 3 shows the wave shapes produced in the circuits shown in FIGURES 1 and 2;

FIGURE 4 is a graph showing this circuit used for multiplication; and

FIGURE 5 is a graph showing this circuit used for division.

Referring now to the drawing, in which like symbols refer to similar components, in FIGURE 1, I show a transformer 1 having a primary winding 2 having a number of turns equal to 2N, a secondary winding 3 having N turns and a pair of tertiary windings 4 and 5 each having relatively few turns. A center tap 7 of the primary winding is connected to the negative terminal of a battery 8. Each end of the primary is connected to a collector electrode of the similar pnp junction transistors shown as 10 and 11 respectively. The transistor 10 has a base electrode 14, an emitter electrode 15 and a collector electrode 16. The transistor 11 has a base electrode 18, an emitter electrode 19 and a collector electrode 20. In order to connect the emitter electrodes in the primary winding circuit, a voltage divider shown as the similar resistors 22 and 23 is connected between the emitter electrode 15 and the emitter electrode 19. The positive terminal of the battery 8 is connected to the center tap 24 of the voltage divider 22—23. The aforementioned circuitry forms a rectangular wave oscillator having a frequency of oscillation dependent on the voltage $E_0$ of battery 8, and the saturation flux density of the transformer iron. This oscillator is analogous in operation to a relaxation oscillator and may be termed an inductance relaxation oscillator.

In the primary portion of the network, the terminals 25 and 26 are connected across the voltage divider 22—23 to provide a ready means for applying a variable unidirectional input voltage $E_1$. The voltage $E_1$, with the terminal 25 positive, causes the effective voltage across the transistor 10 to be greater than the effective voltage across the transistor 11. The addition of the voltage $E_1$ to the oscillator network increases the magnitude of the current flow in the transistor 10 and decreases the magnitude of the current flow in the transistor 11.

In the secondary circuit, the alternating current diagonal of a bridge rectifier 27 and a load resistor 30 are serially connected across the secondary winding 3. The other terminals 28—29 of the bridge rectifier 27 are connected across a variable direct current signal source $E_2$.

An output voltage $E_3$ across the load resistor 30 energizes an averaging voltmeter 31 which preferably has a time constant considerably greater than the period of the relaxation oscillator and, acting as an integrator, subtracts the negative volt-second portion of the signal across the load resistor 30 from the positive volt-second portion and reads the average of the difference.

Referring to FIGURE 3, I have shown the wave shape of the signals in the secondary circuit of the above-described relaxation oscillator with the axis of ordinates in volt scale, and the axis of abscissas the time scale. The wave shape 3a represents the output signal $E_4$ of the secondary winding 3 with no signal $E_1$ applied across the terminals 25—26 and the terminals 28—29 shunted. The wave shape 3b shows the signal $E_4$ in the secondary circuit with $E_1$ equal to $E_0$ and the terminals 28—29 shunted. Assuming $E_2$ equal to $E_0/2$, the wave shape 3c shows the portion of the signal $E_4$ which is blocked by $E_2$ when the oscillator is operating with no signal $E_1$ across the terminals 25—26. The wave shape 3d shows the portion of the signal $E_4$ which is blocked by $E_2$ when the oscillator is operating with $E_1$ equal to $E_0$. The wave shape 3e shows the current through the load resistor 30 when no signal is applied across the terminals 25—26 and $E_2$ equals $E_0/2$ with the turns ratio of the primary winding 2 to the winding 3 being 2:1, and the wave shape 3f shows the current through resistor 30 when $E_0$ equals $E_1$. The blocking voltage $E_2$ biases the rectifiers to prevent current flow through the bridge until the voltage $E_4$ is greater than $E_2$. This results in a relatively simple device for reducing the magnitude of both the positive and negative portions of the voltage $E_4$. Because of the switching action of the transistors 10 and 11, it is apparent this relaxation oscillator develops a rectangular voltage wave across all of the associated circuit components in the secondary circuit. With the current shown by the wave shape 3f, the averaging voltmeter 31 will sense the wave shape of the current as it is dissipated thereacross and will indicate a positive voltage because the area of the positive portion of the wave shape is greater than that of the negative portion of the wave shape. However, in FIGURE 3e the wave shape is still symmetric so that no signal will be indicated by the averaging voltmeter 31.

Referring again to FIGURE 1, the voltage divider 22—23, the battery 8, the primary winding 2 of the transformer 1, and the tertiary windings 4 and 5 are connected in circuit with the transistors 10 and 11 to form a rectangular wave oscillator. When the battery voltage $E_0$ is applied to the circuit in a polarity adapted to induce current flow in the transistors 10 and 11, one of the transistors 10 or 11 will start conducting because of the fact that the impedance presented in loop 41, consisting of the battery 8, the resistor 22, the transistor 10 and the portion 7—36 of the primary 2 will not be identical to the impedance presented by the loop 42, consisting of the battery 8, the resistor 23 of the voltage divider, the transistor 11 and the portion 7—37 of the primary winding 2.

Assume that there is no applied signal $E_1$ and that the network conditions predominately favor the initiation of conduction in the transistor 10. The tertiary winding 5 is coupled magnetically to the primary winding 2 in a sense enhancing the conductivity of the transistor 10 under these conditions, and the tertiary winding 4 is coupled magnetically to the primary winding 2 in a sense inhibiting current flow through the transistor 11. Current will continue to flow in loop 41 until the transformer 1 is saturated. The magnitude of the current in loop 41 is controlled by the resistor 22 and the inductance of the portion 7—36 of the primary winding 2. During the conductive periods of the transistor 10, the parameters are such that the current is limited primarily by the impedance of the inductance of the circuit so that it is continually increasing so long as the transistor 10 continues to conduct. When the transformer core is saturated by this current, the driven voltage produced by flux changes in the switching tertiary winding 5 will no longer bias the transistor 10 to enhance current flow therein and the impedance of the transistor 10 now causes a reduction of the flow of this current in loop 41, permitting the flux of the transformer 1 to decrease and induce in the winding 4 a voltage, initiating conductance through the transistor 11, while at the same time the winding 5 has induced therein a switching potential further inhibiting conduction in the transistor 10.

This immediately reduces the current in the winding 2 so that the tertiary winding 4 is energized to enhance current flow in the transistor 11. $E_0$ causes current to flow in loop 42 from the battery 8, through the resistor 23, through the transistor 11 and the portion 7—37 of the primary 2. When the current has increased sufficiently to drive the flux of the transformer 1 to the opposite saturation line and the transformer 1 again becomes saturated, the tertiary coil 4 will no longer drive the transistor 11 into a conductive state whereby its impedance will immediately increase and the cycle will be repeated. This relaxation oscillator produces the rectangular wave shown in FIGURE 3a. It should be noted that the area in the positive portion of FIGURE 3a is equal to the area of the negative portion. It is apparent that the volt-second product required to drive the core of the transformer 1 from one saturation limb to another is a constant and dependent on the saturation flux density of the iron and the effective cross-sectional area of the core of the transformer 1. With the volt-second product of each half cycle a constant, the average unidirectional content of the wave shape is zero.

In FIGURE 3a, equal increments of time are utilized for the positive half-cycle and the negative half-cycle. This may be accomplished by having no signal $E_1$, having the resistors 22 and 23 of the voltage divider equal, having the tap 7 in the precise electrical center of the primary winding 2 so that both halves of the winding have N turns, and having tertiary windings 4 and 5 equal.

The change in flux in primary winding 2 is equal to two times the saturation flux density of the iron times the effective cross-sectional area of the core and is a constant under all conditions for a given reactor design. I shall designate this quantity as Y. The increment of time necessary for the positive half-cycle to saturate the core of the transformer 1, I shall designate as $t_1$, and the increment of time necessary for the negative half-cycle as $t_2$, the reactive voltage induced in the loop circuit 41 equals $V_1$ and the reactive voltage induced in the loop circuit 42 equals $V_2$, therefore:

(1) $\qquad V_1 = NY/t_1$
(2) $\qquad V_2 = NY/t_2$
(3) $\qquad V_1 = E_0 + E_1/2$
(4) $\qquad V_2 = E_0 - E_1/2$ From the solution of Equations 1 through 4, one obtains:

(5) $\qquad t_1 = 2NY/(2E_0 + E_1)$
(6) $\qquad t_2 = 2NY/(2E_0 - E_1)$

It is easily seen from these equations that with no signals $E_1$, $t_1$ equals $t_2$ so that the wave forms shown as 3a, c, and e will appear in the secondary circuit.

The frequency of this oscillator is equal to $1/(t_1+t_2)$. Substituting Equations 5 and 6 shows that the frequency is equal to $(4E_0^2 - E_1^2)/8NYE_0$.

The voltage $E_4$ induced in the secondary winding 3 having N' turns will be equal to the voltage in the primary winding times $N'/N$ during each half-cycle and will have a time duration of $t_1$ and $t_2$ respectively for each half-cycle.

The bridge rectifier 27 is biased by the voltage $E_2$ applied across the terminals 28—29 to effectively subtract from peak value of the secondary voltage a value which will be constant during both $t_1$ and $t_2$ portions of the wave as shown in FIGURES 3c and 3d. Letting $E'_4$ equal the positive value of $E_4$ and $E''_4$ equal the negative value of $E_4$, assume a clockwise current flow in the secondary circuit. Thus, the rectifiers 27a and 27b conduct a current $(E'_4-E_2)/R$ where R is the total resistance of the circuit which is substantially equal to the resistance of the resistor 30. With a counterclockwise current flow, the value of the current is $(E''_4-E_2)/R$. It becomes apparent that the average voltage across the resistor 30 is expressed by the positive volt-seconds impressed on the resistor 30 minus the negative volt-seconds impressed on the resistor 30 divided by the time duration of the cycle. Expressed mathematically this becomes:

(7) $$E_3 = \frac{1}{t_1+t_2}[(E'_4-E_2)t_1 - (E''_4-E_2)t_2]$$

Substituting the value of Equations 5 and 6 for $t_1$ and $t_2$ and the positive and negative values of $E_4$ shown mathematically as:

(8) $$E'_4 = (2E_0+E_1)N'/2N$$
(9) $$E''_4 = (2E_0-E_1)N'/2N$$

We find the following:

(10) $$E_3 = \frac{\left(E_0+\frac{E_1}{2}\right)\left(E_0-\frac{E_1}{2}\right)}{2NYE_0}\left[\frac{E_2NY}{E_0-\frac{E_1}{2}} - \frac{E_2NY}{E_0+\frac{E_1}{2}}\right]$$

Expanding:

(11) $$E_3 = \frac{2E_0E_2NY + E_1E_2NY - 2E_0E_2NY + E_1E_2NY}{4NYE_0}$$

Which reduces to:

(12) $$E_3 = E_1E_2/2E_0$$

This result is shown graphically in FIGS. 4 and 5. In FIGURE 4 the value of $E_1$ is indicated on the axis of the abscissa in volts and the value of $E_3$ is indicated on the axis of the ordinate in volts. $E_0$ is kept constant at a value of 25 volts and $E_2$ is shown as the parameter. The line OA represents the value of the $E_2$ signal as 4 volts. Line OB, OC, OD, OE, OF, OG, OH, OI, and OJ show the readings where $E_2$ is 8, 12, 16, 20, 24, 28, 32, 36 and 40 volts respectively.

With N' equal to 2N, only the portion of the FIGURE 4 below the curve KL could be used. It should be noted that the point L is reached only when $E_3$ is zero. If N' were equal to N, the curve OL would be the upper limit of correct values. With N' equal to 3N, the curve ML would bound the correct values.

There are two reasons for this, both of which are readily apparent from analysis of Equations 6 and 9. Referring to Equation 6, when $E_1$ approaches $2E_0$, $t_2$ approaches infinity so that the relaxation oscillator will not function. As $E_1$ approaches the value $2E_0$, the voltage of $E_2$ is limited to the voltage of the minimum negative half-cycle $E''_4$ as shown in FIGURE 3d and Equation 9. Thus, at any time the effective boundary line KL, ML or OL is exceeded, with the respective value of N' turns being utilized, the voltage $E_3$ will be in error by an amount proportional to the excess of $E_2$ over $E'_4$.

Referring to Equation 9, any time that $E''_4$ is less than $E_2$ the subtraction of the signal by $E_2$ from the wave shapes shown in FIGURE 3 creates an inaccuracy. This may always be compensated for by having $E_0$ much greater than the anticipated $E_1$ and/or $E_2$. For instance, if $E_0$ were reduced to 12.5 volts and N' were equal to 2N, the curve, ON would indicate the upper limit of current values for FIGURE 4, and the parameter values of OA—OJ would be halved to correct the curve to the scales for the values of $E_1$ and $E_3$ shown.

The portions of the lines AO–OJ shown as dotted lines will not give accurate reading for any of the values of N' and $E_0$ suggested.

Since the total flux necessary to saturate the core of the transformer 1 is constant during the positive and negative half cycles, I have found that the area in the wave shapes shown in FIGURES 3a and b is equal during both the positive and negative half cycles. Shown mathematically I have found:

(13) $$E'_4 t_1 - E''_4 t_2 = 0$$

and

(14) $$E'_4 : E''_4 = t_2 : t_1 = (2E_0+E_1) : (2E_0-E_1)$$

When the $E_0$ signal is battery voltage, $E_0$ becomes a constant K, and:

(15) $$E'_4 : E''_4 = (K+E_1) : (K-E_1)$$

Referring now to FIGURE 5, I have shown the results of Equation 12 when the network is used as a divider where the value of $E_0$ is indicated on the axis of the abscissa in volts and the value of $E_2$ is indicated on the axis of the ordinate in volts $E_1$ held constant at a value of 10 volts and the quotient $E_3$ used as a parameter with the lines PQ, PR, PS, PT, PU, PV, PW and PX equal to 1, 2, 3, 4, 6, 8, 10, and 12 volts respectively. It should be noted that the dotted line YZ is plotted from the Equation 9 when N'=2N and only the values to the right of YZ will give true results.

If $E_1$ were reduced to a value of 5 volts, the line Y'Z' would mark the limitation of this circuit when used to divide. However, it should be noted that the lines PQ, PR, PS, PT, PU, PV, PW, and PX equal 1/2, 1, 3/2, 2, 3, 4, 5 and 6 respectively. Thus, it is readily seen that this circuit divides voltages in any proportion providing neither $E_1$ nor $E_2$ equal $2E_0$ and further provided $E_3$ is not as great as $E_1$ or $E_2$ when N' equals 2N. If the turns ratio were changed so that N' equal 4N with $E_1$ equal to 10 volts, the dotted line Y"Z bounds the limitation of true readings. The dotted portions of PQ–PX will not give accurate results for any of the values of N' and $E_1$ suggested. It should also be noted that if $E_1$ and $E_2$ were interchanged in FIGURE 5, the curve would remain as shown.

Referring to FIG. 2, I have shown one way of connecting the multiplier of my invention to prevent overload on a diesel engine 50. The engine 50 is connected to drive a direct current generator 51 and an exciter 52. The generator 51 is provided with a main field winding 53 and a compensating winding 54. The main winding 53 is connected in circuit with the exciter 51 to be energized thereby. In order to control the voltage of the generator 51, the output of the exciter 52 is controlled by a main field winding 57 and a differential field winding 58. In order to sense the current and voltage of the generator 51, the oscillator input voltages $E_1$ and $E_2$ are derived respectively from the current shunt resistor 60 and the output voltage terminals 62 and 63 of the generator 51. The differential field 58 is connected to cross the resistor 30 (FIG. 1) to receive the output voltage $E_3$ after it is integrated by a capacitor 64. I prefer that the inductance of the differential winding 58 be sufficient to average the wave shape shown in FIG. 3f. Thus, I am able to reduce the output voltage of the generator 51 in proportion to the power output of the generator.

While I have shown and described a particular embodiment of this invention, further modifications and improvements will occur to those skilled in the art. I desire it understood, therefore, that this invention is not limited to the form shown and I intend by the appended claims to cover all modifications which do not depart from the true spirit and scope of this invention.

What I claim as new and desire to secure by Letters Patent of the United States is:

1. An electric function network comprising a rectangular wave oscillator having an average full cycle output voltage equal to zero, means to apply a first unidirectional signal to said oscillator to change the ratio of the magnitude of the positive output voltage to the magnitude of the negative output voltage without affecting the value of the average output voltage, means for combining a second unidirectional voltage with the positive output voltage and the negative output voltage to reduce the maximum excursion of each of said output voltages by a substantially equal amount, and means for sensing the integrated resulting voltage.

2. An electric function network comprising a rectangular wave relaxation oscillator having an output signal with the positive volt-seconds equal to the negative volt-seconds, means to apply a first unidirectional signal to said oscillator to change the ratio of the magnitude of the positive voltage to the magnitude of the negative voltage, the average volt-seconds of any cycle of oscillation remaining zero, means to reduce the magnitudes of the positive voltage and the negative voltage by an amount dependent on the magnitude of a second unidirectional signal, and means for sensing the average of the resultant voltage.

3. A unidirectional multiplier for multiplying $E_1$ by $E_2$ where $E_1$ and $E_2$ are variable unidirectional voltages and $K$ is a constant voltage comprising a rectangular wave relaxation oscillator having a saturable core member for producing an output signal with constant volt-second half cycles, electric circuit means for applying $E_1$ to the oscillator to regulate the ratio of the magnitude of the positive voltage to the magnitude of the negative voltage of the output signal to equal $$(K+E_1):(K-E_1)$$

means for subtracting the quantity $E_2$ from the absolute value of both the positive and negative half cycles of the output signal, and means for sensing the average voltage remaining.

4. A unidirectional multiplier comprising a rectangular wave relaxation oscillator having a saturable core member for providing a constant volt-seconds half cycle output signal, electric circuit means for applying a first unidirectional signal to the oscillator circuit for changing the ratio of the magnitude of the positive voltage to the magnitude of the negative voltage, electric circuit means for connecting a second unidirectional signal in circuit with the output of said oscillator for reducing the magnitudes of the positive voltage and the negative voltage by equal amounts dependent only on the magnitude of said second unidirectional signal, and means for sensing the average voltage remaining.

5. An electric function network for multiplying $E_1$ by $E_2$ and dividing the product by $2E_0$ where $E_0$, $E_1$ and $E_2$ are variable unidirectional voltages comprising, a rectangular wave inductive relaxation oscillator having a saturable core for providing an output voltage with constant volt-seconds in each half cycle resulting in a zero average unidirectional voltage, means for regulating the ratio of the magnitude of the positive voltage to the magnitude of the negative voltage of the output to equal $(2E_0-E_1):(2E_0+E_1)$, and electric circuit means for subtracting $E_2$ from the absolute value of the output voltage during both the positive and negative half cycles of the output voltage.

6. An electric function network for determining the value $E_1E_2/2E_0$ where $E_1$, $E_2$ and $E_0$ are variable unidirectional voltages comprising, a rectangular wave relaxation oscillator having a frequency proportional to $(4E_0^2-E_1^2)/E_0$ and having a saturable core providing an average unidirectional output voltage of zero, said output voltage having equal volt-second half cycles, electric circuit means for combining $E_1$ and $E_0$ to provide a ratio of the positive output voltage to the negative output voltage to equal $(2E_0+E_1)/(2E_0-E_1)$, means for subtracting $E_2$ from the absolute value of both the positive and negative portions of the output voltage, and means for sensing the average unidirectional voltage remaining to obtain the result $E_1E_2/2E_0$.

7. A wave shaping oscillator comprising, a saturable magnetic core having an output winding and a primary winding, the combination of a source of voltage and a switching means connected in circuit with said primary winding and being capable of alternately energizing said primary winding to alternately saturate said core in opposite directions thereby providing alternate voltage half cycles in said output winding having equal volt-second values, and electric circuit means for supplying a unidirectional voltage to bias said core and thus provide a voltage in said output winding with half cycles of one polarity of increased magnitude and reduced duration and half cycles of the other polarity with reduced magnitude and increased duration without affecting the total volt-seconds per half cycle.

8. A wave shaping oscillator comprising, a saturable magnetic core having an output winding and a primary winding, electric circuit means for connecting in circuit with said primary winding a source of voltage and switching means, other electric circuit means for drivably connecting the switching means to sense the polarity of flux excursion in said core to enhance continued conductance until saturation is reached and flux excursion is thus inhibited at which time the conductance of the switching means is altered to enhance reversed current flow in the primary winding, the combination of the source and switching means being of a magnitude and capacity capable of alternately energizing said primary winding to alternately saturate said core in opposite directions thereby providing alternate half cycles having equal volt-second values in said output winding, and electric circuit means for supplying a unidirectional voltage to bias said primary winding and thus provide a voltage in said output winding with half cycles of one polarity of increased magnitude and reduced duration and half cycles of the other polarity with reduced magnitude and increased duration without affecting the total volt-seconds necessary to saturate said core whereby the volt-seconds per half cycle remain constant.

9. An electric function network comprising, a saturable magnetic core having an output winding and a primary winding connected in circuit with a source of voltage and switching means capable of alternately saturating said core in opposite directions at a preselected frequency dependent on the magnitude of the source of voltage, said output winding connected to provide an alternating voltage during such flux excursions whereby the driving of said core between opposite saturation limbs provides an output voltage in said output winding having alternate half cycles with equal volt-second values, electric circuit means for connecting a first unidirectional signal to bias said core and thus provide an output voltage with half cycles of one polarity of increased magnitude and reduced duration and half cycles of the other polarity with reduced magnitude and increased duration without affecting the total volt-seconds per half cycle, means to reduce the magnitude of the positive and negative voltage by substantially equal amounts dependent on the magnitude of a second unidirectional signal, a load impedance, said means to reduce and said impedance being in circuit relation whereby the resulting voltage produces current in said impedance.

10. An electric function network for obtaining the algebraic product of a first and a second unidirectional signal comprising, a saturable magnetic core having an output winding and a primary winding connected in circuit with a source of voltage and switching means capable of alternately saturating said core in opposite directions at a preselected frequency dependent on the magnitude of the source of voltage, said output winding connected to provide an alternating voltage during such flux excursions whereby the driving of said core between opposite saturation limbs provides an output voltage in said output winding having alternate half cycles with equal volt-second values electric circuit means for connecting the first unidirectional signal to bias said core and thus provide an output voltage with half cycles of one polarity of increased magnitude and reduced duration and half cycles of the other polarity with reduced magnitude and increased duration without affecting the total volt-seconds per half cycle, a load impedance, a rectifier bridge having alternate and unidirectional current diagonals, electric circuit means connecting said impedance and said alternating current diagonal serially across said output winding, and electric circuit means for applying the second unidirectional signal to said unidirectional current diagonal to inhibit current flow therein whereby only the voltage of the half cycles of the output voltage in excess of said second signal will cause current flow in said impedance.

11. A unidirectional multiplier for multiplying $E_1$ by $E_2$ where $E_1$ and $E_2$ are variable unidirectional voltages comprising a transformer having a primary winding, a secondary winding and two similar tertiary windings, a center tap on said primary winding, a pair of similar transistors each having a collector terminal connected in circuit with one end of said primary winding respectively, each of said pair of transistors having the base terminal and the emitter terminal serially connected across one of said tertiary windings respectively in such a polarity that the transistors will be biased to conduct alternately, a voltage divider connected between said emitters, a voltage tap at the electrical center of said voltage divider, a constant voltage source connected between said center tap and said voltage tap to form a rectangular wave relaxation oscillator with the voltage wave shape in said secondary winding having a zero average unidirectional voltage and with the frequency of said oscillator inversely proportional to the flux necessary to saturate said transformer, means for applying $E_1$ across said voltage divider to regulate the ratio of the positive voltage to the negative voltage in said secondary winding, a resistor, a bridge rectifier having a pair of diagonal terminals and another pair of terminals, said resistor and said diagonal terminals serially connected across said secondary winding, means for applying $E_2$ across said other pair of terminals in a polarity that will subtract $E_2$ from the absolute magnitude of the voltages of said wave shape of said secondary winding, and an average voltmeter connected across said resistor whereby the average voltmeter will indicate a signal proportional to $E_1E_2$.

12. A unidirectional multiplier for multiplying $E_1$ by $E_2$ and dividing the product $E_1E_2$ by $2E_0$ where $E_0$, $E_1$ and $E_2$ are variable unidirectional voltages comprising a transformer having a primary winding, a secondary winding and two similar tertiary windings, a center tap on said primary winding, a pair of similar transistors each having a collector terminal connected in circuit with one end of said primary winding respectively, each of said pair of transistors having the base terminal and the emitter terminal serially connected across one of said tertiary windings respectively in such a polarity that the transistors will be biased to conduct alternately, a voltage divider connected between said emitters, a voltage tap at the electrical center of said voltage divider, connections for connecting $E_0$ between said said center tap and said voltage tap to form a rectangular wave relaxation oscillator with the voltage wave shape in said secondary winding having a zero average unidirectional voltage and with the frequency of said oscillator inversely proportional to the flux necessary to saturate said transformer, means for applying $E_1$ across said voltage divider to regulate the ratio of the positive voltage to the negative voltage in said secondary winding, a resistor, a bridge rectifier having a pair of diagonal terminals and another pair of terminals, said resistor and said diagonal terminals serially connected across said secondary winding, means for applying $E_2$ across said other pair of terminals in a polarity that will subtract $E_2$ from the absolute voltages of said wave shape of said secondary winding, and an average voltmeter connected across said resistor whereby the average voltmeter will indicate a signal proportional to $E_1E_2/2E_0$.

13. A unidirectional multiplier for multiplying $E_1$ by $E_2$ and dividing the product $E_1E_2$ by $2E_0$ where $E_0$, $E_1$ and $E_2$ are variable unidirectional voltages comprising a transformer having a primary winding, a secondary winding and two similar tertiary windings, a center tap on said primary winding, a pair of similar transistors each having a collector terminal connected in circuit with one end of said primary winding respectively, each of said pair of transistors having the base terminal and the emitter terminal serially connected across one of said tertiary windings respectively in such a polarity that the transistors will be biased to conduct alternately, a voltage divider connected between said emitters, a voltage tap at the electrical center of said voltage divider, connections for connecting $E_0$ between said center tap and said voltage tap to form a rectangular wave relaxation oscillator with the voltage wave shape in said secondary winding having a zero average unidirectional voltage and with the frequency of said oscillator proportional to $$(4E^2_0 - E^2_1)/4E_0$$

connections for connecting $E_1$ across said voltage divider to regulate the ratio of the positive voltage to the negative voltage in said secondary winding to equal $$(2E_0+E_1):(2E_0-E_1)$$

a resistor, a bridge rectifier having a pair of diagonal terminals and another pair of terminals, said resistor and said diagonal terminals serially connected across said secondary winding, connections for connecting $E_2$ across said other pair of terminals in a polarity that will subtract $E_2$ from the absolute magnitude of each half cycle of said wave shape of said secondary winding, and an average voltmeter connected across said resistor whereby the average voltmeter will indicate a signal proportional to $E_1E_2/2E_0$.

References Cited in the file of this patent

UNITED STATES PATENTS

| | | |
|---|---|---|
| 2,710,348 | Baum et al. | June 7, 1955 |
| 2,773,641 | Baum | Dec. 11, 1956 |
| 2,783,384 | Bright et al. | Feb. 26, 1957 |

OTHER REFERENCES

A High-Accuracy Time-Division Multiplier (Goldberg), RCA Review, September 1952, pages 265–274.

UNITED STATES PATENT OFFICE
CERTIFICATE OF CORRECTION

Patent No. 3,018,966　　　　　　　　　　January 30, 1962

William B. Zelina

It is hereby certified that error appears in the above numbered patent requiring correction and that the said Letters Patent should read as corrected below.

Column 7, line 70, after "the", each occurrence, insert -- magnitude of the --; column 8, line 75, after "values" insert a comma; column 9, line 61, strike out "said", second occurrence.

Signed and sealed this 29th day of May 1962.

(SEAL)
Attest:

ERNEST W. SWIDER
Attesting Officer

DAVID L. LADD
Commissioner of Patents